(12) United States Patent
Mizukami et al.

(10) Patent No.: US 9,093,228 B2
(45) Date of Patent: Jul. 28, 2015

(54) METHOD FOR PRODUCING ELECTRIC STORAGE DEVICE, AND ELECTRIC STORAGE DEVICE

(75) Inventors: Motoki Mizukami, Hokuto (JP); Kenji Nansaka, Koufu (JP); Nobuo Ando, Nakakoma-gun (JP)

(73) Assignee: JM Energy Corporation, Hokuto-shi (JP)

( * ) Notice: Subject to any disclaimer, the term of this patent is extended or adjusted under 35 U.S.C. 154(b) by 304 days.

(21) Appl. No.: 13/520,695

(22) PCT Filed: Dec. 24, 2010

(86) PCT No.: PCT/JP2010/073269
§ 371 (c)(1),
(2), (4) Date: Jul. 5, 2012

(87) PCT Pub. No.: WO2011/104988
PCT Pub. Date: Sep. 1, 2011

(65) Prior Publication Data
US 2012/0281339 A1   Nov. 8, 2012

(30) Foreign Application Priority Data

Feb. 26, 2010   (JP) ................................. 2010-042302

(51) Int. Cl.
*H01G 9/00* (2006.01)
*H01G 11/84* (2013.01)
*H01G 9/06* (2006.01)
*H01M 2/16* (2006.01)
*H01M 4/134* (2010.01)
(Continued)

(52) U.S. Cl.
CPC ................. *H01G 11/84* (2013.01); *H01G 9/06* (2013.01); *H01G 11/06* (2013.01); *H01G 11/82* (2013.01); *H01M 2/1673* (2013.01); *H01M 4/134* (2013.01); *H01M 10/052* (2013.01); *H01M 10/0587* (2013.01); *H01M 2/168* (2013.01); *Y02E 60/122* (2013.01); *Y02E 60/13* (2013.01); *Y10T 29/43* (2015.01)

(58) Field of Classification Search
USPC .................................. 361/502–503; 29/25.03
See application file for complete search history.

(56) References Cited

U.S. PATENT DOCUMENTS

2009/0154064 A1* 6/2009 Tasaki et al. .................. 361/505
2009/0246626 A1* 10/2009 Tasaki et al. .................. 429/208

FOREIGN PATENT DOCUMENTS

| CN | 1332484 A | 1/2002 |
| CN | 101341624 A | 1/2009 |

(Continued)

OTHER PUBLICATIONS

International Search Report Issued Apr. 5, 2011 in PCT/JP10/73269 Filed Dec. 24, 2010.

(Continued)

*Primary Examiner* — Eric Thomas
(74) *Attorney, Agent, or Firm* — Oblon, McClelland, Maier & Neustadt, L.L.P.

(57) ABSTRACT

A method of producing an electric storage device includes a fastening that includes fastening a laminate that includes a lithium foil and a metal foil to at least one of a first separator and a second separator using a bonding member, and a winding that includes winding the first separator, the second separator, the laminate, a cathode, and an anode to obtain a wound element, one of the first separator and the second separator being disposed between the cathode and the anode.

4 Claims, 8 Drawing Sheets

(51) Int. Cl.
*H01M 10/052* (2010.01)
*H01M 10/0587* (2010.01)
*H01G 11/06* (2013.01)
*H01G 11/82* (2013.01)

(56) References Cited

FOREIGN PATENT DOCUMENTS

| | | |
|---|---|---|
| JP | 63-69152 A | 3/1988 |
| JP | 11 204144 | 7/1999 |
| JP | 2007 67105 | 3/2007 |
| JP | 2007 173615 | 7/2007 |

OTHER PUBLICATIONS

U.S. Appl. No. 13/582,064, filed Aug. 31, 2012, Watanabe et al.
Combined Office Action and Search Report issued Jun. 12, 2014 in Taiwanese Patent Application No. 100104411 (with English translation).
Combined Chinese Office Action and Search Report issued Sep. 16, 2014 in Patent Application No. 201080064645.1 (with English language translation).
Office Action issued for Chinese Application No. 201080064645.1 on Apr. 16, 2015 with English Translation.

* cited by examiner

METHOD FOR PRODUCING ELECTRIC STORAGE DEVICE, AND ELECTRIC STORAGE DEVICE

TECHNICAL FIELD

The present invention relates to a method of producing an electric storage device, and an electric storage device.

BACKGROUND ART

In recent years, a lithium-ion capacitor that combines the principles of a lithium-ion secondary battery and an electrical double layer capacitor has attracted attention as an electric storage device that may be used for applications that require high energy density and high output characteristics. The lithium-ion capacitor is configured so that the energy density can be significantly increased by causing the anode to occlude (store) and support lithium ions (hereinafter may be referred to as "doping") using an electrochemical method or the like to lower the anode potential.

For example, JP-A-2007-67105 discloses technology that disposes a lithium foil (lithium ion source) in a wound element formed by disposing a separator between a cathode and an anode, and winding the cathode, the anode, and the separator, and dopes lithium ions into the anode via electrochemical contact between the anode and the lithium foil.

SUMMARY OF THE INVENTION

Technical Problem

The wound element may be formed by compression-bonding a laminate to a separator, and winding the laminate together with the separator, the laminate being obtained by compression-bonding a lithium foil to a metal foil (e.g., copper). The laminate is formed by sequentially compression-bonding the lithium foil and the metal foil to the separator, for example. The lithium foil may become hard due to a reaction with a small amount of water contained in the atmosphere. As a result, the laminate may be removed from the separator, or displaced from a given position when transferring the separator to which the laminate is bonded, for example.

An object of several aspects of the invention is to provide a method of producing an electric storage device that can prevent a situation in which a lithium foil is removed from a separator, and improve the positional accuracy of a laminate. Another object of several aspects of the invention is to provide an electric storage device produced by the above method.

Solution to Problem

The invention was conceived in order to solve at least some of the above problems, and may be implemented by the following aspects or application examples.

Application Example 1

According to one aspect of the invention, there is provided a method of producing an electric storage device including a fastening step that includes fastening a laminate that includes a lithium foil and a metal foil to at least one of a first separator and a second separator using a bonding member, and a winding step that includes winding the first separator, the second separator, the laminate, a cathode, and an anode to obtain a wound element, one of the first separator and the second separator being disposed between the cathode and the anode.

Application Example 2

The method of producing an electric storage device according to Application Example 1, wherein the fastening step may include providing the bonding member on the laminate on a side of a lead end.

Application Example 3

The method of producing an electric storage device according to Application Example 1, wherein the bonding member may come in contact with the metal foil, but may be spaced apart from the lithium foil.

Application Example 4

The method of producing an electric storage device according to Application Example 1 may further include placing the wound element in a container, and injecting an electrolytic solution into the container.

Application Example 5

The method of producing an electric storage device according to Application Example 4 may further include doping lithium ions into the anode by short-circuiting the laminate and the anode.

Application Example 6

According to another aspect of the invention, there is provided an electric storage device including an wound element obtained by winding a first separator, a second separator, a lithium electrode current collector, a cathode, and an anode, one of the first separator and the second separator being disposed between the cathode and the anode, and the lithium electrode current collector being fastened to at least one of the first separator and the second separator using a bonding member.

Advantageous Effects of the Invention

According to the method of producing an electric storage device according to one aspect of the invention, the laminate obtained by compression-bonding the lithium foil to the metal foil can be fastened to the first separator using the bonding member. Therefore, the bond strength of the laminate with the first separator can be increased as compared with the laminate is merely compression-bonded to the first separator, for example. This makes it possible to prevent a situation in which the laminate is removed from the first separator, and improve the positional accuracy (alignment accuracy) of the laminate.

DESCRIPTION OF EMBODIMENTS

Preferred embodiments of the invention are described below with reference to the drawings.

1. Electric Storage Device

Figure 1:
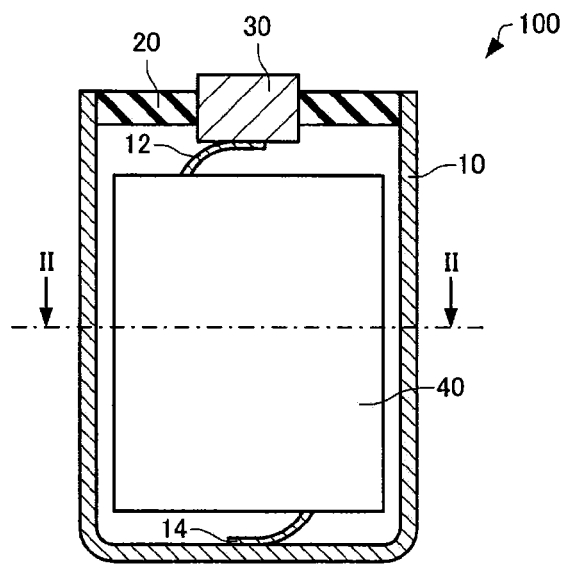
FIG. 1 is a cross-sectional view schematically illustrating an electric storage device according to one embodiment of the invention.
Figure 2:
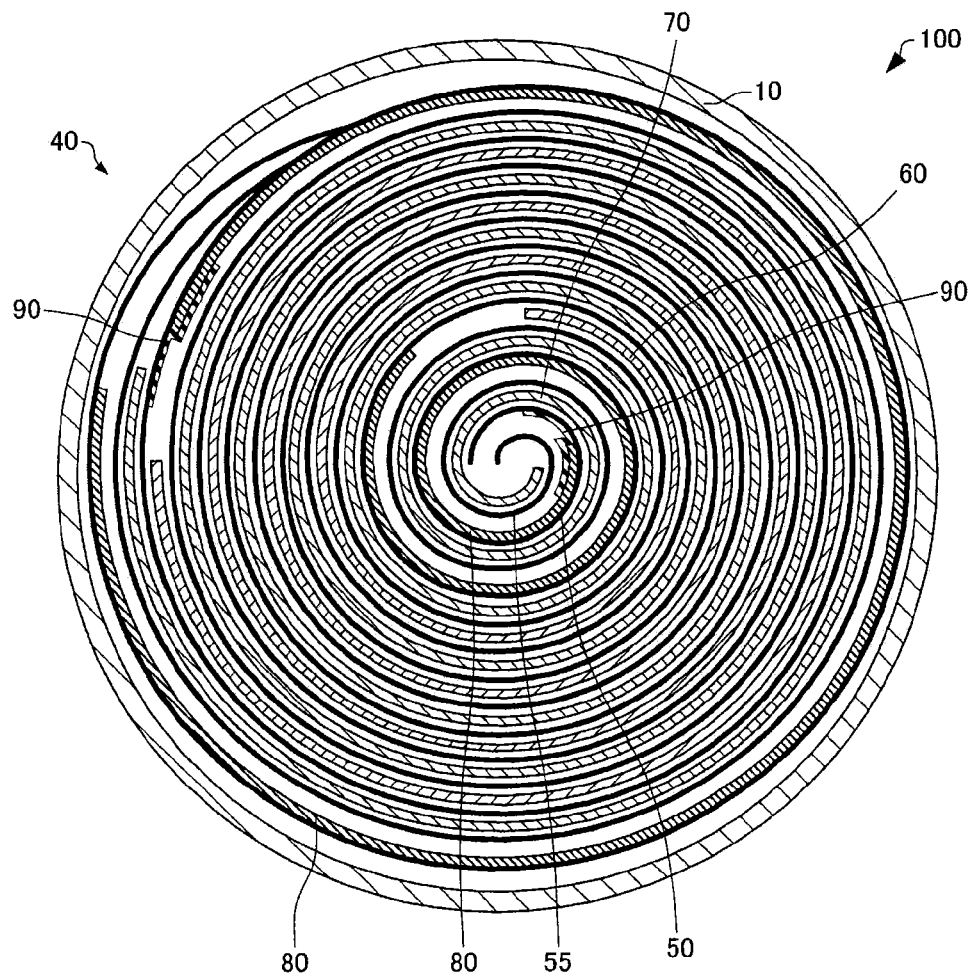
FIG. 2 is a cross-sectional view schematically illustrating an electric storage device according to one embodiment of the invention.

An electric storage device according to one embodiment of the invention is described below with reference to the drawings. FIG. 1 is a cross-sectional view schematically illustrating an electric storage device 100 according to one embodiment of the invention. FIG. 2 is a cross-sectional view (taken along the line II-II in FIG. 1) schematically illustrating the electric storage device 100 according to one embodiment of the invention. Note that a wound element 40 is illustrated in FIG. 1 in a simplified manner. A cathode 60, an anode 70, and a laminate 80 are illustrated in FIG. 2 in a simplified manner. An example in which the electric storage device 100 is a lithium-ion capacitor is described below.

As illustrated in FIGS. 1 and 2, the electric storage device 100 may include a container 10, a sealing plate 20, a cathode terminal 30, and the wound element 40.

As illustrated in FIG. 1, the container 10 has a cylindrical shape having an upper opening, for example. Examples of a material for forming the container 10 include aluminum, copper, nickel, iron, stainless steel, and the like. The wound element 40 and an electrolytic solution are provided in the container 10. An anode lead 14 is connected to the inner surface of the container 10, for example. The inner surface of the container 10 and the anode 70 of the wound element 40 may be electrically connected via the anode lead 14. Therefore, an area of the container 10 positioned on the anode side may serve as an anode terminal 71. Examples of a material for forming the anode lead 14 include copper, stainless steel, nickel, and the like.

The sealing plate 20 is secured on the edge of the opening of the container 10. The sealing plate 20 may have insulating properties, or may have conductivity. When the sealing plate 20 has conductivity, an insulating member (not illustrated in FIG. 1) may be provided between the sealing plate 20 and the cathode terminal 30, for example.

The cathode terminal 30 is fitted into an opening formed in the sealing plate 20. Examples of a material for forming the cathode terminal 30 include aluminum and the like. A cathode lead 12 is connected to the lower side of the cathode terminal 30, for example. The cathode terminal 30 and the cathode 60 of the wound element 40 may be electrically connected via the cathode lead 12. Examples of a material for forming the cathode lead 12 include aluminum and the like. When employing the above configuration, the cathode terminal 30 is electrically connected to the cathode, and the anode terminal 71 is electrically connected to the anode.

In the example illustrated in FIG. 1, the anode lead 14 may be electrically connected to the container 10, and the anode lead 14 may be electrically connected to a terminal that is present at the position of the cathode terminal 30 (not illustrated in the drawings). In this case, the terminal that is present at the position of the cathode terminal 30 may function as an anode terminal, and the terminal that is present at the position of the anode terminal 71 may function as a cathode terminal.

Figure 3:
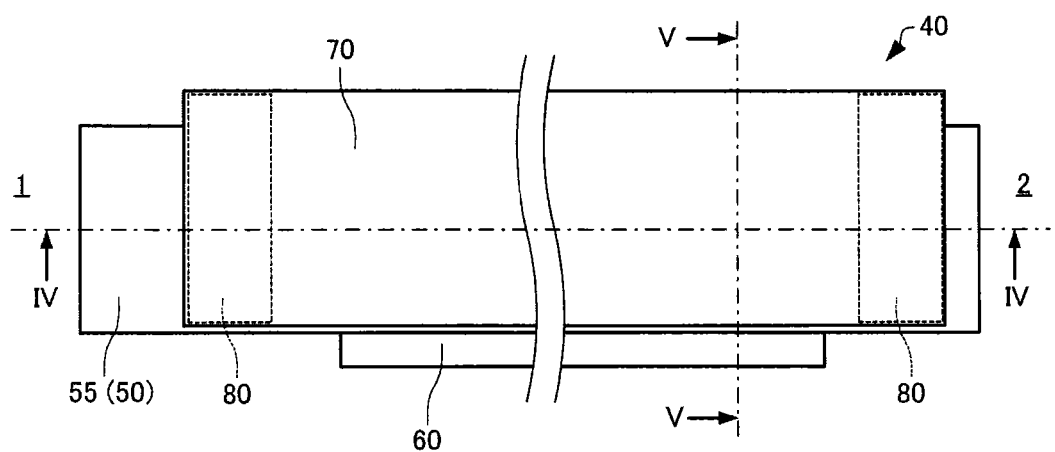
FIG. 3 is a plan view schematically illustrating a wound element of an electric storage device according to one embodiment of the invention.
Figure 4:
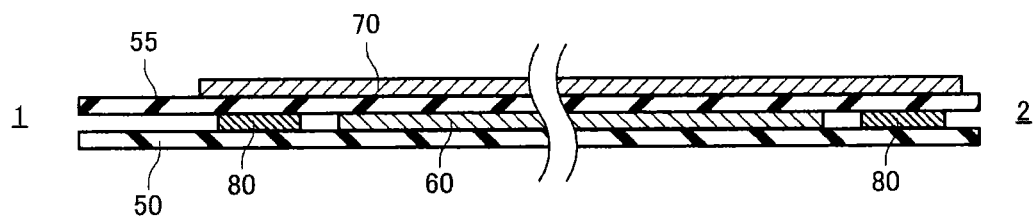
FIG. 4 is a cross-sectional view schematically illustrating a wound element of an electric storage device according to one embodiment of the invention.
Figure 5:
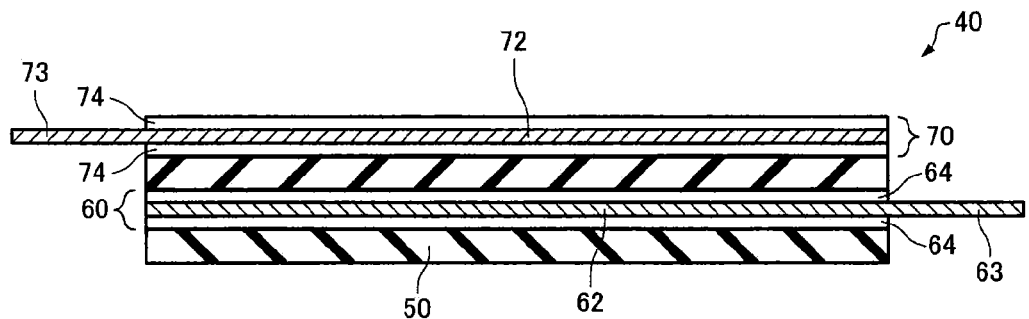
FIG. 5 is a cross-sectional view schematically illustrating a wound element of an electric storage device according to one embodiment of the invention.

The wound element 40 is provided in the container 10, and immersed in the electrolytic solution. As illustrated in FIG. 2, the wound element 40 includes a first separator 50, a second separator 55, the cathode 60, the anode 70, and the laminate 80. FIG. 3 is a plan view schematically illustrating a state in which the wound element 40 is extended (i.e., unwound state). FIG. 4 is a cross-sectional view (taken along the line IV-IV in FIG. 3) schematically illustrating the wound element 40. FIG. 5 is a cross-sectional view (taken along the line V-V in FIG. 3) schematically illustrating the wound element 40. The cathode 60, the anode 70, and the laminate 80 are illustrated in FIG. 4 in a simplified manner.

As illustrated in FIGS. 3 to 5, the wound element 40 is formed by sequentially stacking the first separator 50, the cathode 60, the second separator 55, and the anode 70, and winding the first separator 50, the cathode 60, the second separator 55, and the anode 70 from a lead end 1 toward a tail end 2. The laminate 80 is provided on at least one of the first separator 50 and the second separator 55. In the example illustrated in FIG. 2, the laminate 80 is fastened to the first separator 50 using a bonding member 90, and wound together with the first separator 50 to form the wound element 40. As illustrated in FIG. 2, the wound element 40 has a spiral cross-sectional shape.

Each member of the wound element 40 is described below.

1.1. First Separator and Second Separator

Figure 6:
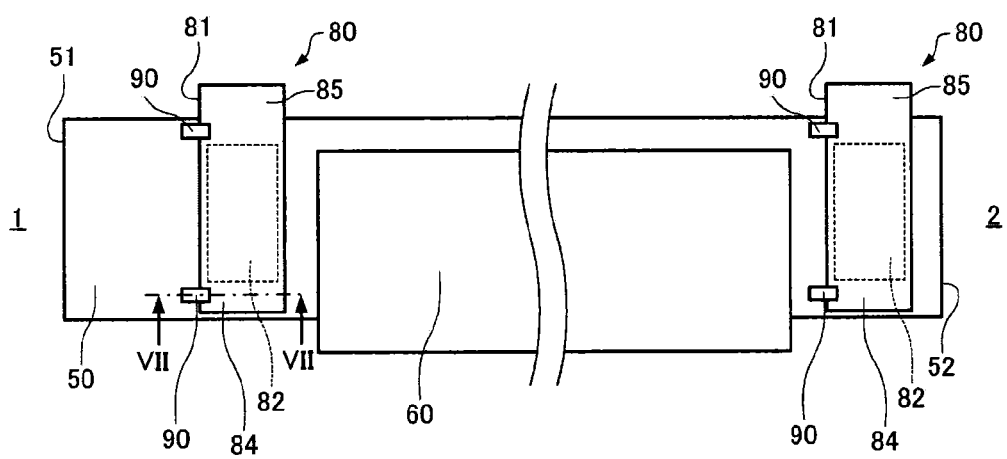
FIG. 6 is a plan view schematically illustrating a wound element of an electric storage device according to one embodiment of the invention.
Figure 7:
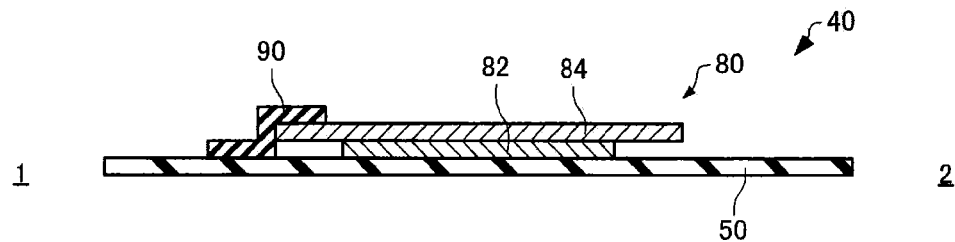
FIG. 7 is a cross-sectional view schematically illustrating a wound element of an electric storage device according to one embodiment of the invention.

FIG. 6 is a plan view schematically illustrating a state in which the wound element 40 is extended. In FIG. 6, the second separator 55 and the anode 70 illustrated in FIG. 3 are omitted for convenience of illustration. FIG. 7 is a cross-sectional view (taken along the line VII-VII in FIG. 6) schematically illustrating the wound element 40.

The first separator 50 and the second separator 55 have a substantially identical shape, and are formed of a substantially identical material. The following description is given taking the first separator 50 as an example.

The first separator 50 is in the shape of a sheet. In the example illustrated in FIG. 6, the first separator 50 has a rectangular planar shape having a first side 51 and a second side 52 as a short side. The first separator 50 is wound from the first side 51 toward the second side 52 to form the wound element 40 illustrated in FIG. 2. Therefore, the first side 51 is positioned on the lead end 1, and the second side 52 is positioned on the tail end 2.

A porous material that exhibits durability against the electrolytic solution, a cathode active material, and an anode active material may be used as a material for forming the first separator 50. More specifically, a nonwoven fabric formed of cellulose, cellulose/rayon, polyethylene, polypropylene, an aramid resin, an amide-imide, polyphenylene sulfide, a polyimide, or a mixture thereof, a porous film, or the like may be used as the first separator 50. The thickness of the first separator 50 is 15 to 50 micrometers, for example. The first separator 50 isolates the cathode 60 and the anode 70 when the first separator 50 is wound. The first separator 50 allows the electrolytic solution to pass through.

1.2. Laminate

As illustrated in FIGS. 6 and 7, the laminate 80 is secured on the separator 50 using the bonding member 90. The laminate 80 may be compression-bonded to the first separator 50, and fastened to the first separator 50 using the bonding member 90. In the example illustrated in FIG. 6, two laminates 80 are provided on the first separator 50 on the lead end 1 and the tail end 2 with the cathode 60 positioned therebetween. Therefore, the laminates 80 are respectively disposed at the center and the periphery of the wound element 40 illustrated in FIG. 2. As illustrated in FIG. 7, the laminate 80 may include a lithium foil 82 and a metal foil 84 formed of a material other than lithium, the lithium foil 82 and the metal foil 84 being sequentially stacked on the first separator 50.

The lithium foil 82 is compression-bonded to the first separator 50, for example. As illustrated in FIG. 6, the lithium foil 82 is disposed inside the periphery of the metal foil 84 when viewed from above, for example. The lithium foil 82 functions as a lithium ion source. Specifically, when the wound element 40 illustrated in FIG. 2 is immersed in the electrolytic solution in a state in which the metal foil 84 and the anode 70 are electrically connected (short-circuited), the lithium foil 82 is oxidized, and ionized when electrons flow through the anode 70, and lithium ions are released to the electrolytic solution. The lithium ions are electrochemically doped (pre-doped) into the anode 70 through the electrolytic solution. As a result, the potential of the anode 70 can be decreased. Since the lithium foil 82 is disposed at the center and the periphery of the wound element 40 (see FIG. 2), the lithium ions pass through the porous first separator 50, the porous second separator 55, and the like, and are uniformly pre-doped into the anode 70.

Note that FIGS. 2 to 7 illustrate a state before lithium ions are pre-doped into the anode 70. When lithium ions have been pre-doped into the anode 70, at least part of the lithium foil 82 is released to the electrolytic solution as lithium ions.

The size of the lithium foil 82 is appropriately determined taking account of the amount of lithium ions pre-doped into the anode 70. For example, the lithium foil 82 has a thickness of 50 to 300 micrometers, a length (i.e., the dimension in the direction from the lead end 1 to the tail end 2 (see FIG. 6)) of about 100 mm, and a width (i.e., the dimension in the direction perpendicular to the lengthwise direction) of about 100 mm.

The metal foil 84 is compression-bonded to the lithium foil 82, for example. The metal foil 84 may have an extension section 85 that extends outward from the periphery of the first separator 50 when viewed from above. The metal foil 84 and the anode 70 can be short-circuited, and lithium ions can be pre-doped into the anode 70 by electrically connecting the extension section 85 and the anode 70 via a conductive material (not illustrated in the drawings), or by electrically connecting the extension section 85 and the anode 70 by bending them. Therefore, the laminate 80 may be referred to as a lithium electrode, and the metal foil 84 may be referred to as a lithium electrode current collector.

A porous metal foil may be used as the metal foil 84. In this case, lithium ions can pass through the metal foil 84, and be pre-doped into the anode 70 when forming the wound element 40 illustrated in FIG. 2. Examples of a material for forming the metal foil 84 include copper, stainless steel, and the like. The size of the metal foil 84 is not particularly limited. For example, the metal foil 84 has a thickness of 10 to 200 micrometers, a length of about 100 mm, and a width of about 125 mm.

1.3. Bonding Member

The bonding member 90 fastens the laminate 80 to the first separator 50. In the example illustrated in FIG. 6, two bonding members 90 are provided on one laminate 80. Note that the number of bonding members 90 is not particularly limited. The bonding member 90 comes in contact with the metal foil 84, but is spaced apart from the lithium foil 82, for example. Therefore, pre-doping with lithium ions is not hindered by the bonding member 90. The bonding member 90 is provided at an interval of about 2 mm from the lithium foil 82 when viewed from above, for example. Note that the interval may be appropriately changed depending on the design.

In the example illustrated in FIG. 6, the bonding member 90 is provided on the laminate 80 (metal foil 84) at a position closer to the lead end 1 than the tail end 2. More specifically, the bonding member 90 is provided across the side of the laminate 80 that is positioned closer to the lead end 1 than the tail end 2 when viewed from above. In the example illustrated in FIG. 6, the bonding member 90 is provided across a side 81 of the rectangular laminate 80 that is positioned closer to the lead end 1 than the tail end 2. In the example illustrated in FIG. 6, the bonding member 90 is provided so as not to overlap the lithium foil 82 when viewed from above.

The bonding member 90 may be provided between the first separator 50 and the metal foil 84, and spaced from the lithium foil 82 (not illustrated in the drawings). In this case, the bonding member 90 is provided on the first separator 50, and the laminate 80 is provided on the first separator 50 so that part of the metal foil 84 comes in contact with the bonding member 90.

The size of the bonding member 90 is not particularly limited. For example, the bonding member 90 has a thickness of about 25 micrometers, a length of about 10 mm, and a width of about 8 mm. A material that exhibits durability against an electrolytic solution may be used as a material for forming the bonding member 90. A polyimide tape, a polypropylene (PP) tape, a polyphenylene sulfide (PPS) tape, or the like may be used as the bonding member 90. Note that an arbitrary bonding (adhesive) material may be used as long as the laminate 80 can be bonded.

1.4. Cathode

The cathode 60 is in the shape of a sheet. As illustrated in FIG. 5, the cathode 60 includes a cathode current collector 62 and a cathode active material layer 64.

A porous metal foil may be used as the cathode current collector 62. In this case, lithium ions can pass through the cathode current collector 62, and be pre-doped into the anode 70 when forming the wound element 40 illustrated in FIG. 2. Examples of a material for forming the cathode current collector 62 include aluminum and the like. The thickness of the cathode current collector 62 is not particularly limited. For example, the cathode current collector 62 has a thickness of 20 to 50 micrometers.

The cathode active material layer 64 is provided on the cathode current collector 62. In the example illustrated in FIG. 5, the cathode active material layer 64 is provided on each side of the cathode current collector 62. Note that the cathode active material layer 64 may be provided on either side of the cathode current collector 62. A material that can form an electrical double layer in the vicinity of the interface between the electrolytic solution and the cathode active material layer 64 may be used as a material for forming the cathode active material layer 64. Specific examples of the material for forming the cathode active material layer 64 include activated carbon, an electroconductive polymer, a polyacene organic semiconductor (PAS) that has a polyacene skeleton structure and is obtained by heating an aromatic condensed polymer, and the like.

The cathode current collector 62 may have an uncoated section 63 on which the cathode active material layer 64 is not provided. The uncoated section 63 is formed of the same material as that of the cathode current collector 62, for example. The uncoated section 63 is positioned outside the edge of the first separator 50 when viewed from above when stacking the first separator 50 and the cathode 60, for example. The uncoated section 63 may be connected to the cathode lead 12 (see FIG. 1) when the cathode current collector 62 is wound.

1.5. Anode

The anode 70 is in the shape of a sheet. As illustrated in FIG. 5, the anode 70 includes an anode current collector 72 and an anode active material layer 74.

A porous metal foil may be used as the anode current collector 72. Examples of a material for forming the anode current collector 72 include copper, stainless steel, nickel, and the like. The thickness of the anode current collector 72 is not particularly limited. For example, the anode current collector 72 has a thickness of 20 to 50 micrometers.

The anode active material layer 74 is provided on the anode current collector 72. In the example illustrated in FIG. 5, the anode active material layer 74 is provided on each side of the anode current collector 72. Note that the anode active material layer 74 may be provided on either side of the anode current collector 72. A carbon material that can occlude and release lithium ions may be used as a material for forming the anode active material layer 74. Specific examples of the material for forming the anode active material layer 74 include graphite, non-graphitizable carbon, and PAS.

The anode current collector 72 may have an uncoated section 73 on which the anode active material layer 74 is not provided. The uncoated section 73 is formed of the same material as that of the anode current collector 72, for example. The uncoated section 73 is positioned outside the edge of the second separator 55 when viewed from above when stacking the second separator 55 and the anode 70, for example. The uncoated section 73 may be connected to the anode lead 14 (see FIG. 1) when the anode current collector 72 is wound.

1.6. Electrolytic Solution

A non-aqueous electrolytic solution is used as the electrolytic solution. Examples of the solvent of the electrolytic solution include ethylene carbonate, propylene carbonate, dimethyl carbonate, diethyl carbonate, gamma-butyrolactone, acetonitrile, dimethoxyethane, tetrahydrofuran, dioxolane, methylene chloride, sulfolane, and the like. These solvents may be used either alone or in combination.

A lithium salt may be used as the electrolyte of the electrolytic solution Specific examples of the electrolyte include $LiClO_4$, $LiAsF_6$, $LiBF_4$, $LiPF_6$, $Li(C_2F_5SO_2)_2N$, and the like. The concentration of the electrolyte in the electrolytic solution is 0.5 to 1.5 mol/l, for example.

In the electric storage device 100 according to one embodiment of the invention, the laminate 80 is fastened to the first separator 50 using the bonding member 90. Therefore, the bond strength of the laminate 80 increases as compared with the case where the laminate 80 is merely compression-bonded to the first separator 50, so that the positional accuracy of the laminate 80 can be improved, for example. This makes it possible to prevent a situation in which the laminate 80 and the cathode 60 are short-circuited due to displacement of the laminate 80 for example. It is also possible to suppress a situation in which lithium ions are non-uniformly diffused during pre-doping due to displacement of the laminate 80, so that the energy density of the electric storage device 100 can be improved.

2. Method of Producing Electric Storage Device

A method of producing the electric storage device 100 according to one embodiment of the invention is described below with reference to the drawings. FIGS. 8 to 13 are views illustrating the production steps in the production of the electric storage device 100.

Figure 8:
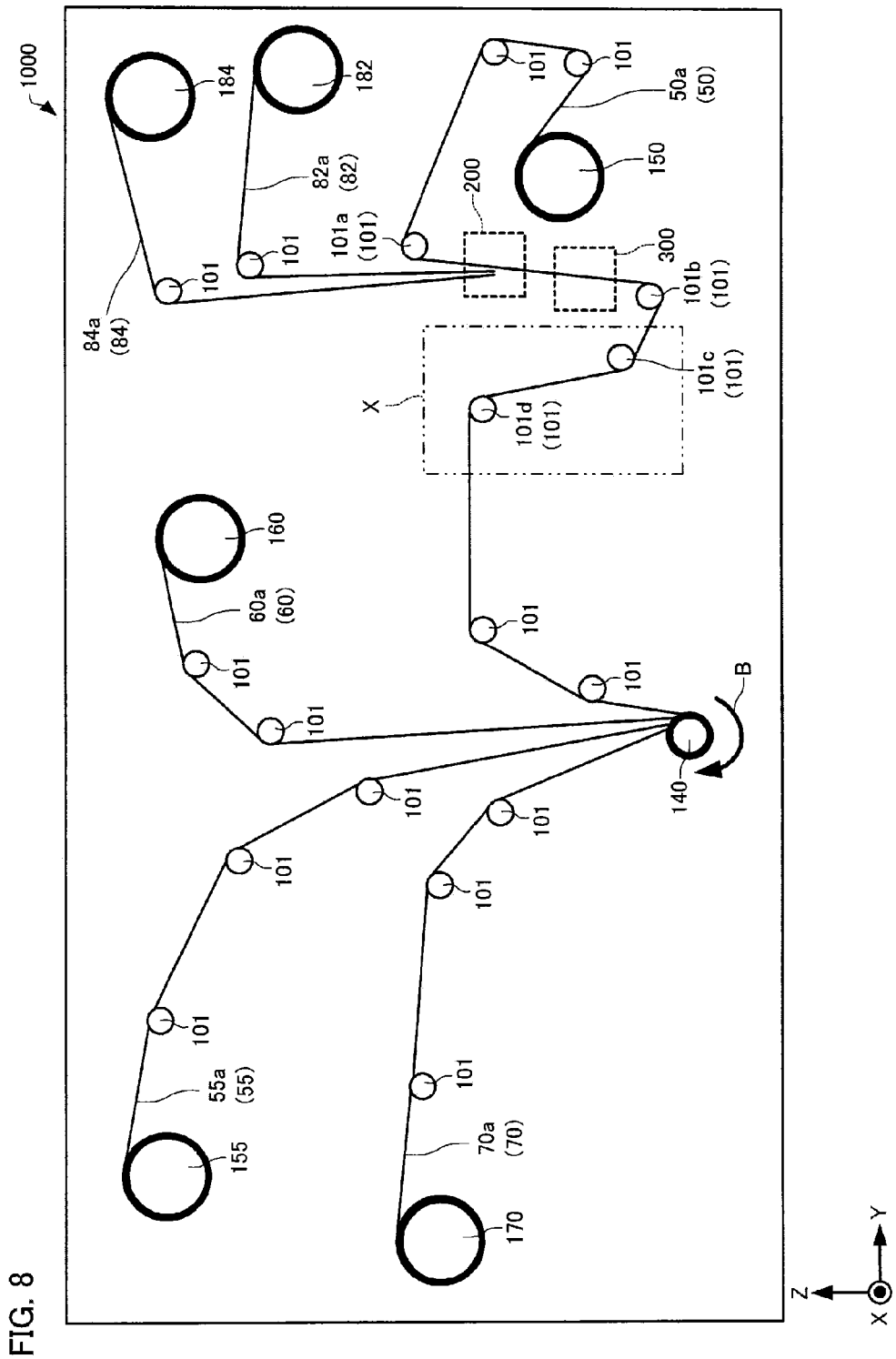
FIG. 8 is a view illustrating a production step of an electric storage device according to one embodiment of the invention.

A winder used to produce the electric storage device 100 is described below. FIG. 8 is a view schematically illustrating a winder 1000 used to produce the electric storage device 100.

As illustrated in FIG. 8, the winder 1000 includes a first separator feed section 150 that feeds the first separator 50, a lithium foil feed section 182 that feeds the lithium foil 82, a metal foil feed section 184 that feeds the metal foil 84, a second separator feed section 155 that feeds the second separator 55, a cathode feed section 160 that feeds the cathode 60, an anode feed section 170 that feeds the anode 70, and a winder section 140 that winds the members transferred from the feed sections 150, 155, 160, 170, 182, and 184. The winder 1000 may further include transfer rollers 101 that transfer the members transferred from the feed sections 150, 155, 160, 170, 182, and 184 to the winder section 140.

The feed sections 150, 155, 160, 170, 182, and 184 and the winder section 140 are dispersed in a Z-axis direction (e.g., vertical direction) illustrated in FIG. 8, for example. This makes it possible to reduce the size of the winder 1000. More specifically, it is possible to reduce the size of the winder 1000 in an X-axis direction or a Y-axis direction (e.g., horizontal direction) illustrated in FIG. 8. Likewise, the transfer rollers 101 are dispersed in the Z-axis direction. Therefore, the transfer paths defined by the arrangement of the transfer rollers 101 are displaced in the Z-axis direction.

Note that the first separator 50 illustrated in FIG. 2 is fed from the first separator feed section 150 as a first separator 50a. Specifically, the first separator 50 that forms the wound element 40 can be obtained by cutting the first separator 50a into a given shape. Likewise, the remaining members that form the wound element 40 can be obtained by cutting the members fed from the feed sections 155, 160, 170, 182, and 184 into a given shape.

2.1. Transfer Step

The members fed from the feed sections 150, 155, 160, 170, 182, and 184 are transferred to the winder section 140 (transfer step) as described below using the winder 1000.

(1) First Separator, Lithium Foil, and Metal Foil

As illustrated in FIG. 8, the first separator 50a fed from the first separator feed section 150 is transferred to a compression bonding mechanism 200 of the winder 1000 through the transfer rollers 101. Likewise, a lithium foil 82a fed from the lithium foil feed section 182 and a metal foil 84a fed from the metal foil feed section 184 are transferred to the compression bonding mechanism 200 through the transfer rollers 101. The transfer paths of the first separator 50a, the lithium foil 82a, and the metal foil 84a are not particularly limited, but are set so that the lithium foil 82a is positioned between the first separator 50a and the metal foil 84a in the compression bonding mechanism 200.

Figure 9:
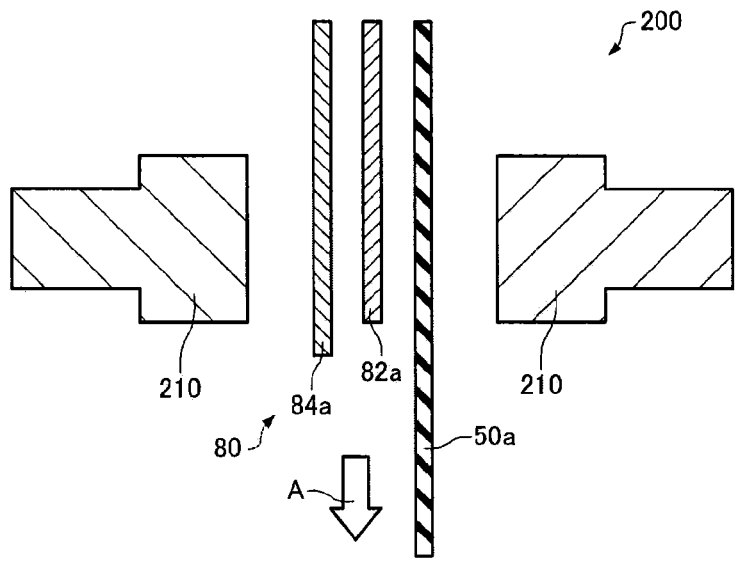
FIG. 9 is a view illustrating a production step of an electric storage device according to one embodiment of the invention.

FIG. 9 is a view schematically illustrating the compression bonding mechanism 200 of the winder 1000. As illustrated in FIG. 9, the compression bonding mechanism 200 performs a compression bonding step that compression-bonds the lithium foil 82*a* and the metal foil 84*a* to one side of the first separator 50*a*. The lithium foil 82*a* and the metal foil 84*a* are cut into a given length and a given shape before compression bonding to obtain the lithium foil 82 and the metal foil 84 (laminate 80). The lithium foil 82 and the metal foil 84 are then compression-bonded to (secured on) one side of the first separator 50*a*. The lithium foil 82*a* and the metal foil 84*a* that have been cut are held by a roller-shaped automatic transfer clamp (not illustrated in the drawings), and transferred to a given cutting position when forming the laminate 80. The compression bonding step is performed by disposing the first separator 50*a*, the lithium foil 82*a*, and the metal foil 84*a* between two compression bonding jigs 210, and pressing the first separator 50*a*, the lithium foil 82*a*, and the metal foil 84*a* at room temperature for 0.5 seconds under a pressure of 0.5 MPa. Examples of a material for forming the compression bonding jig 210 include stainless steel (SS), a resin, and the like. Note that an arrow A in FIG. 9 indicates the transfer direction (moving direction) of the first separator 50*a*.

As illustrated in FIG. 8, the laminate 80 that has been compression-bonded to the first separator 50*a* using the compression bonding mechanism 200 is transferred to a fastening mechanism 300 of the winder 1000. As illustrated in FIGS. 6 and 7, the fastening mechanism 300 performs a fastening step that includes fastening the laminate 80 to the first separator 50*a* using the bonding member 90. The bond strength between the laminate 80 and the first separator 50*a* can be increased by performing the fastening step. This makes it possible to prevent a situation in which the laminate 80 is removed from the first separator 50*a*, or displaced from a given position during transfer or winding as compared with the case where the laminate 80 is merely compression-bonded to the first separator 50*a*. The fastening step may be automatically performed by a fastening system (not illustrated in the drawings), or may be performed manually.

A situation in which the laminate 80 is removed from the first separator 50*a*, or displaced from a given position tends to occur when the laminate 80 passes through the transfer rollers 101 for the following reason. Specifically, the lithium foil 82 of the laminate 80 may become hard during transfer due to a reaction with a small amount of water contained in the atmosphere. The first separator 50*a* is deformed (bent) along the transfer rollers 101*b* to 101*d* when passing through the transfer rollers 101*b* to 101*d* at which the transfer direction changes. However, the lithium foil 82 that has become hard may not be deformed along the transfer rollers 101*b* to 101*d*. In this case, since the lithium foil 82 may not be able to follow deformation of the first separator 50*a*, the laminate 80 may be removed from the first separator 50*a*, or displaced from a given position.

Therefore, it is desirable to transfer the laminate 80 transferred from the compression bonding mechanism 200 to the fastening mechanism 300 before the laminate 80 passes through the transfer rollers 101*b* to 101*d*. Specifically, it is desirable to perform the fastening step before the laminate 80 subjected to the compression bonding step passes through the transfer rollers 101*b* to 101*d*. In the example illustrated in FIG. 8, the compression bonding mechanism 200 and the fastening mechanism 300 are provided between the third transfer roller 101*a* and the fourth transfer roller 101*b* from the first separator feed section 150.

A position at which the bonding member 90 is provided in the fastening step is not particularly limited as long as the laminate 80 can be fastened to the first separator 50*a* using the bonding member 90. The bond strength between the laminate 80 and the first separator 50*a* can be increased irrespective of the position of the bonding member 90. Note that it is desirable to provide the bonding member 90 on the laminate 80 on the side of the lead end 1. The reason therefor is described below with reference to FIGS. 10 to 12. Note that FIGS. 10 to 12 are enlarged view of an area X illustrated in FIG. 8.

Figure 10:
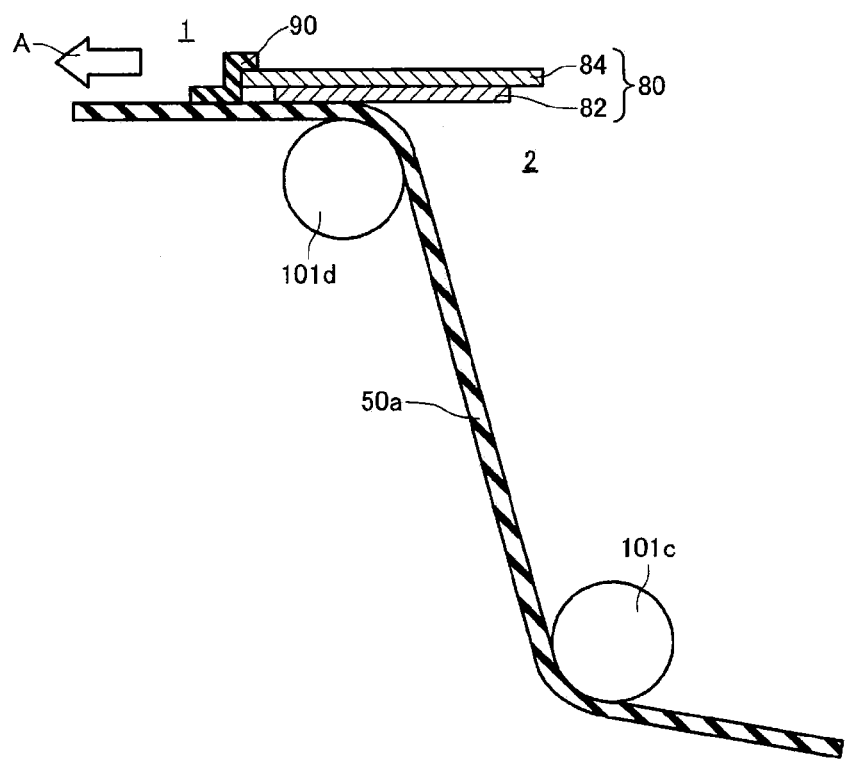
FIG. 10 is a view illustrating a production step of an electric storage device according to one embodiment of the invention.

FIG. 10 is a view illustrating an example in which the bonding member 90 is provided on the laminate 80 on the side of the lead end 1 (on the side of the transfer direction A). In the example illustrated in FIG. 10, the laminate 80 may not be able to follow deformation of the first separator 50*a* when the laminate 80 passes through the transfer roller 101*d*, so that an area of the laminate 80 that is positioned on the side of the tail end 2 and exhibits low bond strength may be removed from the first separator 50*a*. However, since an area of the laminate 80 that is positioned on the side of the lead end 1 is fastened using the bonding member 90, an area of the laminate 80 that is positioned on the side of the tail end 2 is pulled toward the lead end 1, and comes in contact with the first separator 50*a* again. This makes it possible to stably transfer the laminate 80 while preventing a situation in which the laminate 80 is removed from the first separator 50*a*, or displaced from a given position.

Note that the laminate 80 is easily removed from the first separator 50*a* when the laminate 80 passes through the transfer roller 101*d* as compared with the case where the laminate 80 passes through the transfer roller 101*c*. Specifically, since the laminate 80 is positioned between the first separator 50*a* and the transfer roller 101*c* when the laminate 80 passes through the transfer roller 101*c*, removal of the laminate 80 can be prevented by the transfer roller 101*c*.

Figure 11:
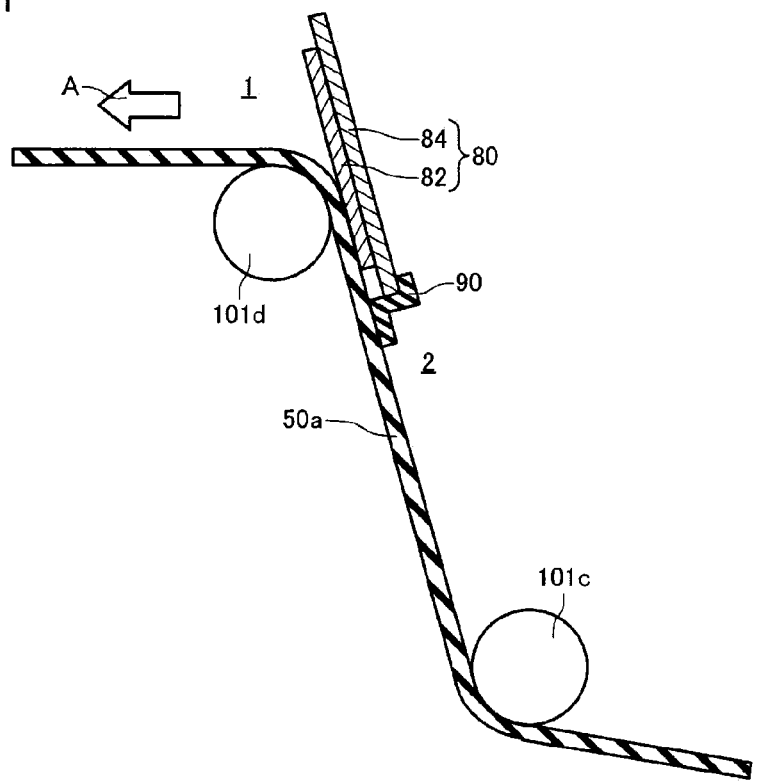
FIG. 11 is a view illustrating a production step of an electric storage device according to one embodiment of the invention.
Figure 12:
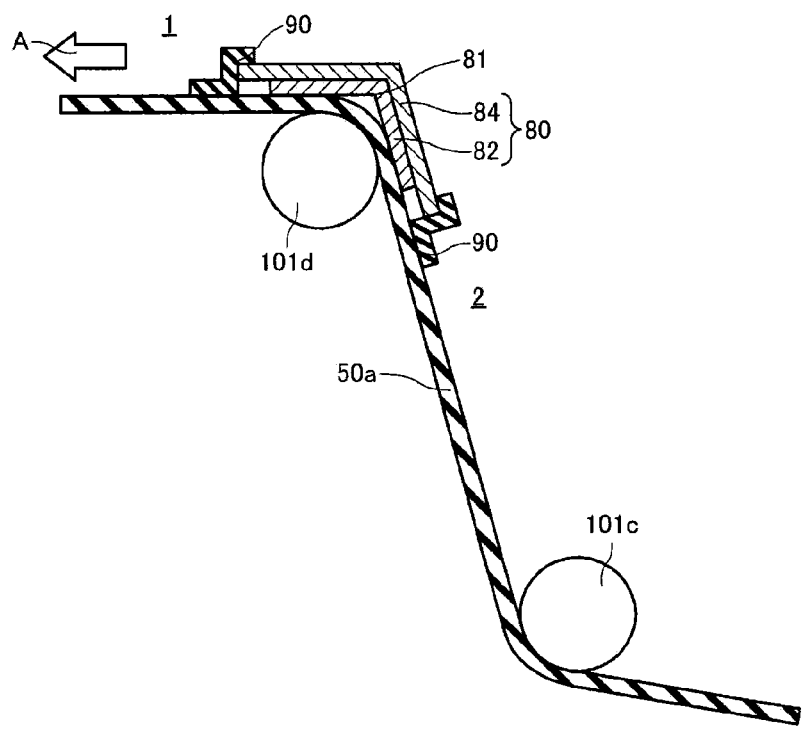
FIG. 12 is a view illustrating a production step of an electric storage device according to one embodiment of the invention.
Figure 13:
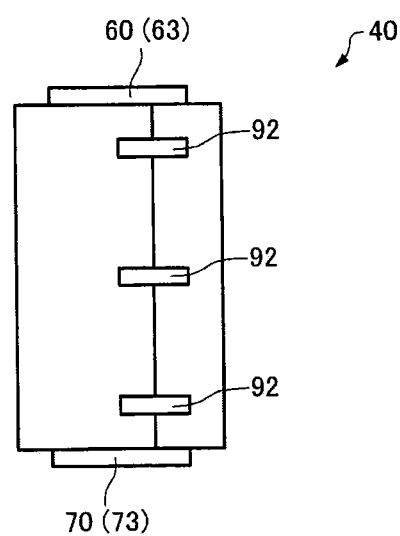
FIG. 13 is a view illustrating a production step of an electric storage device according to one embodiment of the invention.

FIG. 11 is a view illustrating an example in which the bonding member 90 is provided on the laminate 80 on the side of the tail end 2. In the example illustrated in FIG. 11, the laminate 80 may not be able to follow deformation of the first separator 50*a* when the laminate 80 passes through the transfer roller 101*d*, so that an area of the laminate 80 that is positioned on the side of the lead end 1 may be removed from the first separator 50*a*. The area of the laminate 80 that is positioned on the side of the lead end 1 and has been removed from the first separator 50*a* may fall in the direction opposite to the transfer direction A around the area of the laminate 80 that is positioned on the side of the tail end 2 and fastened using the bonding member 90. Therefore, the stability of the laminate 80 during transfer may be low in the example illustrated in FIG. 11 as compared with the example illustrated in FIG. 10.

FIG. 12 is a view illustrating an example in which the bonding members 90 are provided on the laminate 80 on the side of the lead end 1 and the side of the tail end 2. In the example illustrated in FIG. 12, since the laminate 80 is fastened using the bonding members 90 on the side of the lead end 1 and the side of the tail end 2, a center area 81 of the laminate 80 that exhibits low bond strength may be removed from the first separator 50*a* when the laminate 80 passes through the transfer roller 101*d*. As a result, stress may be concentrated on the center area 81 of the laminate 80, so that wrinkles may occur. Therefore, the stability of the laminate 80 during transfer may be low in the example illustrated in FIG. 12 as compared with the example illustrated in FIG. 10.

Accordingly, it is desirable to provide the bonding member 90 on the laminate 80 on the side of the lead end 1.

The laminate 80 is thus provided on the first separator 50*a*, and the laminate 80 and the first separator 50*a* are transferred to the winder section 140.

(2) Second Separator

As illustrated in FIG. 8, the second separator 55*a* is fed from the second separator feed section 155, and transferred to the winder section 140 through the transfer rollers 101.

(3) Cathode

As illustrated in FIG. 8, the cathode 60a is fed from the cathode feed section 160, and transferred to the winder section 140 through the transfer rollers 101.

The cathode 60a is formed by forming the cathode active material layer 64 on each side of the cathode current collector 62 (see FIG. 5), for example. The cathode active material layer 64 is formed by a known method, for example.

The cathode active material layer 64 may be formed as follows. Specifically, a cathode active material powder and a binder are dispersed in an aqueous medium or an organic solvent to prepare a slurry. A conductive powder may optionally be mixed into the slurry. The slurry is applied to the surface of the cathode current collector 62, and dried. The cathode active material layer 64 can thus be obtained.

Examples of the binder used to prepare the slurry include a rubber binder (e.g., styrene-butadiene rubber (SBR), a fluororesin (e.g., polytetrafluoroethylene and polyvinylidene fluoride), a thermoplastic resin (e.g., polypropylene and polyethylene), and the like. The binder is used in an amount of 1 to 20 mass % based on the anode active material powder, for example.

Examples of the conductive powder that may optionally be mixed into the slurry include acetylene black, ketjen black (trademark), graphite, a metal powder, and the like. The conductive powder is used in an amount of 2 to 40 mass % based on the anode active material powder, for example.

(4) Anode

As illustrated in FIG. 8, the anode 70a is fed from the anode feed section 170, and transferred to the winder section 140 through the transfer rollers 101.

The anode 70a is formed by forming the anode active material layer 74 on each side of the anode current collector 72 (see FIG. 5), for example. The anode active material layer 74 is applied by a known method, for example.

The anode active material layer 74 may be formed in the same manner as the cathode active material layer 64 using an anode active material powder instead of the cathode active material powder. Therefore, detailed description of thereof is omitted.

The first separator 50a on which the laminate 80 is fastened, the second separator 55a, the cathode 60a, and the anode 70a can thus be transferred to the winder section 140. The transfer paths of the first separator 50a, the second separator 55a, the cathode 60a, and the anode 70a are not particularly limited, but are set so that the anode 70a, the second separator 55a, the cathode 60a, and the first separator 50a are sequentially disposed from the side of the winder section 140, for example.

2.2. Winding Step

The winder section 140 performs a winding step that includes winding the anode 70a, the second separator 55a, the cathode 60a, and the first separator 50a on which the laminate 80 is fastened in a state in which the anode 70a, the second separator 55a, the cathode 60a, and the first separator 50a are sequentially stacked from the side of the winder section 140, for example. The winder section 140 may be referred to as a winding rod. The winder section 140 can rotate in the direction indicated by an arrow B in FIG. 8. Examples of a material for forming the winder section 140 include a metal material (e.g., stainless steel, copper, and nickel), a resin material (e.g., polypropylene and polyphenylene sulfide), and the like. The separators 50a and 55a, the cathode 60a, and the anode 70a are wound using the winder section 140, and cut into a given length and a given shape.

When the first separator 50, the second separator 55, the cathode 60, and the anode 70 have been wound, the second separator 55 that is positioned on the outermost side is secured using a tape 92 (see FIG. 13), for example. The wound element 40 can thus be formed. The tape 92 may be formed of an arbitrary material as long as the tape 92 exhibits durability against the electrolytic solution. For example, the tape 92 may be formed of polyimide, polypropylene, or the like. In the example illustrated in FIG. 13, three pieces of the tape 92 are used. Note that the number of pieces of the tape 92 is not particularly limited. Note that the wound element 40 may have a configuration in which the winder section 140 remains, or may have a configuration in which the winder section 140 is removed.

2.3. Assembly Step

As illustrated in FIG. 1, the cathode lead 12 is bonded to the cathode 60 of the wound element 40, and the anode lead 14 is bonded to the anode 70 of the wound element 40 by ultrasonic welding, for example. The wound element 40 to which the leads 12 and 14 are bonded is placed in the container 10, and the opening of the container 10 is sealed using the sealing plate 20 into which the cathode terminal 30 is fitted. The cathode lead 12 is then welded to the lower side of the cathode terminal 30, and the anode lead 14 is welded to the inner surface of the container 10.

The electrolytic solution is then injected through an injection port (not illustrated in FIG. 1) of the sealing plate 20, and the injection port is sealed.

The electric storage device 100 can be produced by the above steps.

The method of producing the electric storage device 100 according to one embodiment of the invention has the following features, for example.

According to the method of producing the electric storage device 100 according to one embodiment of the invention, the laminate 80 may be fastened to the first separator 50a using the bonding member 90. This makes it possible to increase the bond strength of the laminate 80, and prevent a situation in which the laminate 80 is removed from the first separator 50a. The positional accuracy of the laminate 80 fastened to the first separator 50a can be improved due to an increase in the bond strength of the laminate 80.

According to the method of producing the electric storage device 100 according to one embodiment of the invention, the bonding member 90 can be provided on the laminate 80 on the side of the lead end 1. This makes it possible to stably transfer the laminate 80 as compared with the case where the bonding member 90 is provided on the laminate 80 on the side of the tail end 2, or the case where the bonding members 90 are provided on the laminate 80 on the side of the lead end 1 and the side of the tail end 2.

According to the method of producing the electric storage device 100 according to one embodiment of the invention, the bonding member 90 comes in contact with the metal foil 84, but is spaced apart from the lithium foil 82. Therefore, predoping with lithium ions is not hindered by the bonding member 90.

According to the method of producing the electric storage device 100 according to one embodiment of the invention, the step that fastens the laminate 80 to the first separator 50a using the bonding member 90 is performed after the step that compression-bonds the laminate 80 to the first separator 50a has been performed, but before the laminate 80 passes through the transfer roller 101. This makes it possible to prevent a situation in which the laminate 80 is removed from the first separator 50a before fastening the laminate 80.

The invention is not limited to the above embodiments. Various modifications and variations may be made. For example, the invention includes various other configurations substantially the same as the configurations described in connection with the above embodiments (e.g., a configuration having the same function, method, and results, or a configuration having the same objective and results). The invention also includes a configuration in which an unsubstantial section (part) described in connection with the above embodiments is replaced by another section (part). The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

REFERENCE SIGNS LIST

1: lead end, 2: tail end, 10: container, 12: cathode lead, 14: anode lead, 20: sealing plate, 30: cathode terminal, 40: wound element, 50: first separator, 55: second separator, 60: cathode, 62: cathode current collector, 64: cathode active material layer, 70: anode, 71: anode terminal, 72: anode current collector, 74: anode active material layer, 80: laminate, 82: lithium foil, 84: metal foil, 90: bonding member, 92: tape, 100: electric storage device, 101: transfer roller, 140: winder section, 150: first separator feed section, 155: second separator feed section, 160: cathode feed section, 170: anode feed section, 182: lithium foil feed section, 184: metal foil feed section, 200: compression bonding mechanism, 210: compression bonding jig, 300: fastening mechanism, 1000: winder

The invention claimed is:

1. A method of producing an electric storage device comprising:
   a fastening that includes fastening a laminate that includes a lithium foil and a metal foil to at least one of a first separator and a second separator using a bonding member; and
   a winding that includes winding the first separator, the second separator, the laminate, a cathode, and an anode to obtain a wound element, one of the first separator and the second separator being disposed between the cathode and the anode,
   wherein the bonding member comes in contact with the metal foil, but is spaced apart from the lithium foil.

2. The method of producing an electric storage device according to claim 1, wherein the fastening includes providing the bonding member on the laminate on a side of a lead end.

3. The method of producing an electric storage device according to claim 1, further comprising placing the wound element in a container, and injecting an electrolytic solution into the container.

4. The method of producing an electric storage device according to claim 3, further comprising doping lithium ions into the anode by short-circuiting the laminate and the anode.

* * * * *